United States Patent Office 3,371,043

Patented Feb. 27, 1968

3,371,043

TWO STAGE PROCESS FOR MAKING FERROMAGNETIC MODIFIED CHROMIUM DIOXIDE

Franz Hund, Krefeld-Bockum, and Wilhelm Abeck, Cologne-Stammheim, Germany, assignors to Farbenfabriken Bayer Aktiengesellschaft, Leverkusen, Germany, a corporation of Germany No Drawing. Continuation of application Ser. No. 383,206, July 16, 1964. This application June 27, 1966, Ser. No. 560,892

Claims priority, application Germany, July 24, 1963, F 40,333

11 Claims. (Cl. 252—62.51)

ABSTRACT OF THE DISCLOSURE

Process of forming ferromagnetic chromium dioxide by a two-step doping process wherein chromium trioxide is heated with a guest component, or a precursor of such guest component, and the resulting product admixed with further guest component and this mixture heated.

This application is a continuation of application Ser. No. 383,206 filed July 16, 1964, now abandoned.

This invention relates to ferromagnetic chromium dioxide. It more particularly relates to a novel method for the preparation of ferromagnetic chromium dioxide and to a method of preparing ferromagnetic chromium dioxide containing modification elements in the crystal lattice thereof.

Ferromagnetic materials are used in many applications. They are employed for instance in magnetic second recording tapes, drums and records, memory devices, cores, etc.

The formation of magnetic chromium oxides by heating $CrO_3$ in a stream of oxygen has already been observed by I. Shukoff, J. Russ. Ges., 41 (1909), pp. 302–304.

According to R. S. Schwartz and co-workers, Am Chem. Soc., 74, 1676 (1952), $CrO_2$ can be prepared from $CrO_3$ with traces of impurities of other oxides of chromium by heating for three hours at temperatures of 545° C. under an increased pressure of oxygen pressure.

Glemser and co-workers, Z.f.anorg. Chem., 277 (1954), p. 114 et seq. investigated the thermal degradation products of $CrO_3$ radiographically and found that ferromagnetic $CrO_2$ is present in the rutile lattice.

B. J. Thamer and co-workers, J. A. Chem. Soc., 79, 1957, pp. 547–550, prepared $CrO_2$ contaminated by CrOOH by heating $CrO_3$ with $H_2O$ under pressure at temperatures of 300 to 325° C.

Ferromagnetic $CrO_2$ in which other metal oxides are incorporated in the lattice is described, for example, in U.S. patent specification 3,034,988. The magnetic properties of these $CrO_2$ mixed phases are improved compared with the magnetic properties of pure chromium dioxide. Above all, mixed phases could be prepared with very different Curie temperatures.

In the preparation of these modified ferromagnetic chromium dioxides, finely divided $CrO_3$ mixed with other metal oxides is usually heated in the presence of water to temperatures up to 500° C. under pressures of about 1 to 3000 atmospheres.

It is an object of the present invention to provide modified ferromagnetic chromium dioxide and a process for its preparation.

A further object is to provide novel chromium dioxide materials containing oxides or fluorides of other elements as guest components in the $CrO_2$ host lattice.

Another object is to provide magnetic recording members having a magnetic track comprising the chemically modified ferromagnetic chromium dioxide.

Still other objects shall become apparent as the description proceeds.

For a number of purposes, e.g., for magnetic recording members, etc., the particle size and shape of the $CrO_2$ crystals have an important influence on the optimum properties. It is therefore an important feature of all processes for the preparation of ferromagnetic materials to obtain a high yield of particles of a certain shape and size which have at the same time good magnetic properties.

In accord with and fulfilling the above-recited objects, this invention resides in one of its aspects in the provision of a process, whereby needle-shaped or prismatic particles of chromium dioxide mixed phases of a desired length and width or with an optimum ratio of length to width having excellent magnetic properties are produced. This process comprises heating, in a first part of the process, chromium trioxide with water in the presence of one or more guest components which are metal oxides or metal fluorides to temperatures of about 100 to 500° C., preferably 100 to 300° C. and pressures of about 1 to 500 atmospheres, preferably about 50 to 300 atmospheres, and in one or several subsequent stages of the process, mixing with chromium trioxide and potential guest components the nuclei of chromium dioxide mixed phases derived from the first heating mediately referred to above, and subjecting such mixture to further hydrothermal treatment at temperatures of about 100 to 500° C. and at the pressures described above.

As guest components oxides or fluorides of such elements can be incorporated into the $CrO_2$ lattice, the ions of which have radii between about 0.98 and 0.46 A., e.g., oxides or fluorides of Li, Na, K, Be, Mg, Al, Ga, In, Ge, Sn, Pb, As, Sb, Bi, Se, Te, Cu, Zn, Sc, Ti, Zr, Hf, V, Nb, Ta, Mo, W, U, Mn, Tc, Re, Fe, Co, Ni, Ru, Pt and J, preferably Sb, Se, Te, Co, Mn, Pt, Ru.

The above-mentioned elements can be applied in the form of their oxides or compounds which form the corresponding oxides under the reaction conditions, e.g., carbonates, chlorides, nitrates. In some cases, it might be preferred to apply the guest components in the form of their chemical elements, e.g., Te, Se, As, Sb, etc. The fluorides are preferably the difluorides having the lattice of rutile, e.g., $MnF_2$, $CoF_2$, $NiF_2$, $FeF_2$, $ZnF_2$, etc.

In particular, it is also possible to incorporate mixtures of these oxides or fluorides into the $CrO_2$ lattice whilst maintaining the rutile lattice or the polyrutile lattice, as described, for example, in U.S. patent specification 3,022,186. According to the U.S. patent mentioned hereinbefore, the preferred ratio of the sum of the added cations to the sum of the added anions is about 1:2.

Where mixtures of the above-referred oxides and/or fluorides are to be employed, salts, complex halogenides or -oxides as well as mixed phases of these elements can be applied. If the incorporation of Sb is intended to be used in combination with other elements, the following compounds can be employed: $NaSbF_4$, $Na_2SbCl_5$, $Sb_2Te_3$, SnSb, $CrSbO_4$, etc. The guest components are used in quantities up to 50 percent by weight referred to $CrO_2$ in the first step of the process to obtain an end-product with a content of guest component of 0.1 to 15 percent by weight referred to $CrO_2$.

The ratio by weight of the $CrO_2$ and the guest components in the individual reaction steps is not specially critical and can be selected in accordance with the desired composition of the final product, however, it is not favorable to perform the first reaction step without the addition of guest components, and in the preferred embodiment of the process the whole amount of guest components desired in the end-product is added in the first reaction step.

In carrying out the process, finely divided chromium trioxide is mixed with an oxide or fluoride of one or more guest components with the addition of small quantities of water. This mixture is heated to temperatures of 100 to 500° C. for about ½ to 4 hours in a reaction vessel of inert material in an autoclave containing water and under an excess pressure of an inert gas and/or oxygen or without the use of a foreign gas, and then kept for about 1 to 10 hours under constant conditions of temperature and pressure. After cooling, the reaction product is powdered and washed free from chromate with water, filtered and dried under mild conditions. The nuclei of the chromium dioxide mixed phases are then again mixed with chromium trioxide and water to which guest components may again be added and then placed in an autoclave containing water, as indicated above, under excess pressure of inert gas and/or oxygen or without foreign gas, and heated to temperatures of 100 to 500° C. and again left for about 1 to 10 hours at constant pressure and temperature.

The modified chromium dioxide prepared by the new process is needle-shaped with a ratio of length to width of about 10:1.

It has very good magnetic properties, e.g., the chromium dioxide which contains antimony oxide has a saturation magnetization $B_{max}/\sigma$ of about 1000 gauss. g.$^{-1}$.cm.$^3$. Further, values of about 450 gauss. g.$^{-1}$.cm.$^3$ were determined for the saturation remanence $B_R/\sigma$ and the coercive force iHc was found to be about 280 to 400 oersted.

A magnetic recording member with very good properties can be prepared as follows: 2.16 kg. of needle-shaped chromium dioxide containing antimony throughout the lattice are ground in a ball mill for 14 hours in a solution of 108 grams of a vinyl chloride homopolymer.

The chromium dioxide lacquer suspension thus prepared is cast on to a 20$\mu$ thick polyester foil. The resulting layer is passed through a homogenous magnetic field of about 1000 oersted while still wet on the surface.

A layer containing 11.5 g./m.$^2$ $CrO_2$ has a thickness of 6$\mu$. The layer has a $B_R/B_S$ value of 0.88. The surface resistance is $<1.10^6$ ohm per cm.

The definitions of the magnetic values given above as well as the methods for their determination are given in R.Ch.H. Müller "Mitteilungen aus den Forschungslabor. der AGFA, Leverkusen"—München, Verlag Springer 1955, pp. 320–325.

The electroacoustic measurements have been made according to DIN 45–512 p. 2 and according to DIN 45–513 p. 4.

The process for the production of modified $CrO_2$ is distinguished by a high yield per volume and time of a material which has the above-described optimum properties.

One cannot obtain a material with the same favorable properties by a single stage process carried out at a longer period, as will be shown in the following examples.

*Example 1*

(a) *Formation of nuclei.*—119.0 g. $CrO_3$ and 8.00 g. $Sb_2O_3$+2.00 ml. $H_2O$ are well mixed, filled into a Pyrex glass tube ($\phi$ 40 mm., 1=150 mm.), and placed above water in an autoclave under an oxygen pressure of 100 atmospheres. Afterwards the system is heated at 300° C. for about 80 minutes whereby the pressure is adjusted to 200 atmospheres and these conditions are maintained for 8 hours.

After cooling, the substance is powdered, washed free from $CrO_4^{2-}$ with distilled water, filtered and dried in a vacuum at 40° C. Yield: 97 g.; magnetic data: $Br/\sigma$=211 G.g.$^{-1}$.cm.$^3$, iHc=197 oe.

(b) *Pigment formation.*—119.0 g. $CrO_3$+8.00 g. $CrO_2$ nuclei from (1*a*)+16.0 ml. $H_2O$ are well mixed, filled into a Pyrex glass tube (see above), put under an oxygen pressure of 100 atmospheres above water in an autoclave and then heated at 300° C. for 80 minutes (pressure approximately 270 atmospheres) and maintained under these conditions for 8 hours.

Further working up as with the nuclear material.

Yield: 100 g.; magnetic data: $Br/\sigma$=450 G.g.$^{-1}$.cm.$^3$, iHc=257 oe.

(c) As comparative showing experiment (1*a*)—nuclei formation—was repeated under the same conditions but performed in one case for 16 hours and in another case after 32 hours. Both end products are worked up as under (1*a*) and their magnetic properties investigated:

(1*c*) 16 hours $Br/\sigma$ 219 G.g.$^{-1}$.cm.$^3$, iHc=230 oe.

(1*c*) 32 hours $Br/\sigma$ 192 G.g.$^{-1}$.cm.$^3$, iHc=170 oe.

*Example 2*

(a) *Formation of nuclei.*—119.0 g. $CrO_3$+8.00 g. $Sb_2O_3$+2.0 ml. $H_2O$ are well mixed, filled into a Pyrex glass tube, placed above water in an autoclave under an oxygen pressure of 100 atmospheres and then heated for about 80 minutes at 280° C. and the pressure is then adjusted to 200 atmospheres and these conditions maintained for 8 hours. After cooling, the substance is powdered, washed free from $CrO_4^{2-}$ with distilled $H_2O$ and dried in a vacuum at 40° C.

Yield: 94 g.; magnetic data: $Br/\sigma$=189 G.g.$^{-1}$.cm.$^3$, iHc=204 oe.

(b) *Pigment formation.*—119.0 g. $CrO_3$+8.0 g. nuclei (2*a*)+20.0 ml. $H_2O$ are well mixed, filled into a Pyrex glass tube, placed above water in an autoclave under an oxygen pressure of 120 atmospheres and then heated for about 80 minutes at 300° C. and kept at this temperature for 8 hours (final pressure about 270 atmospheres). The preparation is powdered after cooling, washed free from $CrO_4^{2-}$ with distilled $H_2O$, filtered and dried in a vacuum at 40° C.

Yield: 110 g.; magnetic data: $Br/\sigma$=448 G.g.$^{-1}$.cm.$^3$, iHc=342 oe.

After drying in air at 105° C., the magnetic data are: $Br/\sigma$=440 G.g.$^{-1}$.cm.$^3$, iHc=342 oe.

*Example 3*

(a) *Formation of nuclei.*—119.0 g. $CrO_3$+8.00 g. $Sb_2O_3$ are well mixed, poured into a Pyrex glass tube and placed above water in an autoclave under an oxygen pressure of 100 atmospheres and then heated at 260° C. for about 80 minutes and the pressure is then adjusted to 200 atmospheres and these conditions maintained for 8 hours.

After cooling, the substance is powdered, washed free from $CrO_4^{2-}$ with distilled $H_2O$, filtered and dried in a vacuum at 40° C.

Yield: 93 g.; magnetic data: $Br/\sigma$=247 G.g.$^{-1}$.cm.$^3$, iHc=237 oe.

(b) *Pigment formation.*—119.0 g. $CrO_3$+8.00 g. nuclei (3*a*)+8.0 ml. $H_2O$ are well mixed, filled into a Pyrex glass tube, placed above water in an autoclave under an oxygen pressure of 120 atmospheres and then heated at 300° C. for about 80 minutes and kept at this temperature for 8 hours (final pressure about 270 atmospheres). After cooling, the preparation is powdered, washed free from $CrO_4^{2-}$ with distilled water, filtered and dried in a vacuum at 40° C.

Yield: 99 g.; magnetic data: $Br/\sigma$=455 G.g.$^{-1}$.cm.$^3$, iHc=266 oe.

*Example 4*

(a) Formation of nuclei as in Example 2*a*; a V4A (stainless steel) tube is used instead of a Pyrex glass tube.

Yield: 93 g.; magnetic data: $Br/\sigma$=242 G.g.$^{-1}$.cm.$^3$, iHc=252 oe.

(b) *Pigment formation.*—119.0 g. $CrO_3$+8.00 g. nuclei (4*a*)+16.00 ml. $H_2O$ are well mixed, poured into a V4A tube, heated at 300° C. for about 80 minutes in an autoclave without foreign gas and kept at this temperature for 8 hours (final pressure about 90 atmospheres). After cooling, the preparation is powdered, washed free from $CrO_4^{2-}$ with distilled water, filtered and dried in a vacuum at 40° C.

Yield: 103 g.; magnetic data: Br/$\sigma$=487 G.g.$^{-1}$.cm.$^3$, iHc=374 oe.

*Example 5*

(a) Formation of nuclei as in Example 1.

Yield: 94 g.; magnetic data: Br/$\sigma$=221 G.g.$^{-1}$.cm.$^3$, iHc=204 oe.

(b) *Pigment formation.*—119.0 g. $CrO_3$+8.00 g. nuclei (5*a*)+16.0 ml. $H_2O$ are well mixed, filled into a V4A tube, put under a pressure of 60 atmospheres $O_2$+60 atmospheres $N_2$ over $H_2O$ in an autoclave, and then heated at 300° C. for about 80 minutes (pressure about 270 atmospheres) and kept thus for 8 hours. Further working up as with the other examples.

Yield: 102 g.; magnetic data: Br/$\sigma$=470 G.g.$^{-1}$.cm.$^3$, iHc=349 oe.

*Example 6*

(a) Formation of nuclei as in (5*a*).

(b) Pigment formation as in (5*a*) except that a pressure of 120 atmospheres $N_2$ was used instead of 60 atmospheres $O_2$+60 atmospheres $N_2$.

Yield: 104 g.; magnetic data: Br/$\sigma$=456 G.g.$^{-1}$.cm.$^3$, iHc=325 oe.

*Example 7*

(a) *Formation of nuclei.*—119.0 g. $CrO_3$+8.00 g. $Sb_2O_3$+2.0 ml. $H_2O$ are well mixed, filled into a V4A tube, placed in an autoclave under a pressure of over 50 atmospheres $O_2$ and 50 atmospheres $N_2$ and then heated at 280° C. for 80 minutes and the pressure is then adjusted to 200 atmospheres and these conditions maintained for 8 hours. Working up as in the other examples.

Yield: 95 g.; magnetic data: Br/$\sigma$=185 G.g.$^{-1}$.cm.$^3$, iHc=168 oe.

(b) *Pigment formation.*—119.0 g. $CrO_3$+8.00 g. nuclei (7*a*)+16.0 ml. $H_2O$ are well mixed, filled into a V4A tube, heated at 300° C. for about 80 minutes in an autoclave above $H_2O$ without the addition of foreign gases and maintained at this temperature for 8 hours (final pressure 90 atmospheres). Working up as in the other examples.

Yield: 102 g.; magnetic data: Br/$\sigma$=417 G.g.$^{-1}$.cm.$^3$, iHc=387 oe.

*Example 8*

(a) Formation of nuclei as in Example 2*a*.

Yield: 93 g.; magnetic data: Br/$\sigma$=242 G.g.$^{-1}$.cm.$^3$, iHc=252 oe.

(b) Pigment formation as in Example 2*b*.

The material was kept for only 1 hour instead of for 8 hours at 300° C. at a final pressure of 270 atmospheres.

Yield: 92 g.; magnetic data: Br/$\sigma$=451 G.g.$^{-1}$.cm.$^3$, iHc=338 oe.

*Example 9*

(a) *Formation of nuclei.*—119.0 g. $CrO_3$+ 4.00 g. TeO+2.00 ml. $H_2O$ are mixed well, introduced into a V4A tube and put under an oxygen pressure of 100 atmospheres in an autoclave above $H_2O$ and then heated to 280° C. in about 80 minutes, the pressure being then adjusted to 200 atmospheres and these conditions maintained for 8 hours. After cooling, the substance is powdered, washed free from $CrO_4^{2-}$ with distilled $H_2O$, filtered and dried in a vacuum at 400° C.

Yield: 99.3 g.; magnetic data: Br/$\sigma$=296 G.g.$^{-1}$.cm.$^3$, iHc=267 oe.

(b) *Pigment formation.*—119.0 g. $CrO_3$+8.00 g. $CrO_2$ nuclei from 9*a*+16.0 ml. $H_2O$ are mixed well, filled into a V4A tube, put under an oxygen pressure of 120 atmospheres in an autoclave of above $H_2O$ and then heated for 80 minutes at 300° C. (pressure 270 ats.) and maintained thus for 8 hours. Further working up as for the nuclear material.

Yield: 101.7 g.; magnetic data: Br/$\sigma$=445 G.g.$^{-1}$.cm.$^3$, iHc=286 oe.

*Example 10*

(a) *Formation of nuclei.*—119.0 g. $CrO_3$+8.00 g. $TeO_3$+2.00 ml. $H_2O$ are mixed well and the further treatment is as in Example 9.

Yield: 104.5 g.; magnetic data: Br/$\sigma$=300 G.g.$^{-1}$.cm.$^3$, iHC=270 oe.

(b) *Pigment formation.*—119.0 g. $CrO_3$+8.00 $CrO_2$ nuclei from 10*a*+16.0 ml. $H_2O$ are mixed well and then worked up as in Example 9*b*.

Yield: 100.6 g.; magnetic data: Br/$\sigma$=443 G.g.$^{-1}$.cm.$^3$, iHc=282 oe.

*Example 11*

(a) *Formation of nuclei.*—59.5 g. $CrO_3$+2.00 g. PtO+1.0 ml. $H_2O$ are mixed well, introduced into a V4A tube and put under an oxygen pressure of 100 atmospheres in an autoclave above $H_2O$ and then heated to 280° C. in about 60 minutes and the pressure is then adjusted to 200 atmospheres and these conditions maintained for 8 hours. After cooling, the substance is powdered, washed free from $CrO_4^{2-}$ with distilled water, filtered and dried in a vacuum at 40° C.

Yield: 50.6 g.; magnetic data: Br/$\sigma$=246 G.g.$^{-1}$.cm.$^3$, iHc=81 oe.

(b) *Pigment formation.*—119.0 g. $CrC_3$+8.00 g. $CrO_2$ nuclei from 11*a*+16.0 ml. $H_2O$ are mixed well, filled into a V4A tube, put under an oxygen presure of 120 atmospheres in an autoclave above water and then heated to 300° C. for about 60 minutes (pressure 270 atmospheres) and kept under these conditions for 8 hours. Further working up as for the nucleus.

Yield: 103.4 g.; magnetic data: Br/$\sigma$=309 G.g.$^{-1}$.cm.$^3$. iHc=105 oe.

*Example 12*

(a) *Formation of nuclei.*—59.5 g. $CrO_3$+4.00 g. $RuO_2$+1.0 ml. $H_2O$ are mixed well and then treated as in Example 11*a*.

Yield: 43.0 g.; magnetic data: Br/$\sigma$=182 G.g.$^{-1}$.cm.$^3$, iHc=118 oe.

(b) *Pigment formation.*—119.0 g. $CrO_3$+8.00 g. $CrO_2$ nuclei from 12*a*+16.0 ml. $H_2O$ are mixed well and then worked up as in Example 11*b*.

Yield: 104.0 g.; magnetic data: Br/$\sigma$=279 G.g.$^{-1}$.cm.$^3$, iHc=91 oe.

*Example 13*

(a) *Formation of nuclei.*—119.0 g. $CrO_3$+1.947 g. MnO+8.00 g. $Sb_2O_3$+2.0 ml. $H_2O$ are mixed well, introduced into a V4A tube and put under an oxygen pressure of 100 atmospheres in an autoclave above $H_2O$ and then heated to 280° C. for about 60 minutes and the pressure is then adjusted to 200 atmospheres and these conditions maintained for 8 hours. After cooling, the substance is powdered, washed free from $CrO_4^{2-}$ with distilled water, filtered and dried in a vacuum at 40° C.

Yield: 102.8 g.; magnetic data: Br/$\sigma$=222 G.g.$^{-1}$.cm.$^3$, iHc=236 oe.

(b) *Pigment formation.*—119.0 g. $CrO_3$+8.00 g. $CrO_2$ nuclei from 13*a*+16.0 ml. $H_2O$ are mixed well, filled into a V4A tube and put under an oxygen pressure of 120 atmospheres in an autoclave above $H_2O$ and heated to 300° C. for about 60 minutes (pressure 270 atmospheres) and kept under these conditions for 8 hours. Further working up as for the nuclei.

Yield: 104.3 g.; magnetic data: Br/$\sigma$=498 G.g.$^{-1}$.cm.$^3$, iHc=388 oe.

*Example 14*

(a) *Formation of nuclei.*—119.0 g. $CrO_3$+4.98 Se+2.0 ml. $H_2O$ are mixed well, introduced into a V4A tube and put under an oxygen pressure of 100 atmospheres in an autoclave above $H_2O$ and then heated to 280° C. in about 60 minutes and the pressure is then adjusted to 200 atmospheres and these conditions maintained for 8 hours. After cooling, the substance is powdered, washed free from $CrO_4^{2-}$ with distilled water, filtered and dried in a vacuum at 40° C.

Yield: 68.0 g.; magnetic data: Br/σ=32 G.g.$^{-1}$.cm.$^3$, iHc=57 oe.

(b) *Pigment formation.*—119.0 g. $CrO_3$+8.00 g. $CrO_2$ nuclei from 14*a*+16.0 ml. $H_2O$ are mixed well, filled into a V4A tube, put under an oxygen pressure of 120 atmospheres in an autoclave above $H_2O$ and then heated to 300° C. in about 60 minutes (pressure 270 atmospheres) and maintained under these conditions for 8 hours. Further working up as for the nuclear material.

Yield: 99.0 g.; magnetic data: Br/σ=276 G.g.$^{-1}$.cm.$^3$, iHc=81 oe.

*Example 15*

(a) *Formation of nuclei.*—119.0 g. $CrO_3$+8.00 g. $SeO_3$+2.0 ml. $H_2O$ are mixed well, introduced into a V4A tube and put under an oxygen pressure of 100 atmospheres in an autoclave above $H_2O$ and then heated to 250° C. for about 60 minutes and the pressure is then adjusted to 170 atmospheres and these conditions maintained for 8 hours. After cooling, the substance is powdered, washed free from $CrO_4^{2-}$ with distilled water, filtered and dried in a vacuum at 40° C.

Yield: 74.5 g.; magnetic data: Br/σ=11 G.g.$^{-1}$.cm.$^3$, iHc=1 oe.

(b) *Pigment formation.*—119.0 g. $CrO_3$+8.00 g. $CrO_2$ nuclei from 15*a*+16.0 ml. $H_2O$ are mixed well, filled into a V4A tube, put under an oxygen pressure of 120 atmospheres in an autoclave above $H_2O$ and then heated to 300° C. in about 60 minutes (pressure 270 atmospheres) and maintained under these conditions for 8 hours. Further working up as for the nuclear material.

Yield: 102.3 g.; magnetic data: Br/σ=225 G.g.$^{-1}$.cm.$^3$, iHc=67 oe.

*Example 16*

(a) *Formation of nuclei.*—119.0 g. $CrO_3$+8.00 g. PbO+2.0 ml. $H_2O$ are mixed well, introduced into a V4A tube and put under an oxygen pressure of 100 atmospheres in an autoclave above $H_2O$ and then heated to 280° C. in about 60 minutes and the pressure is then adjusted to 200 atmospheres and these conditions powdered, washed free from $CrO_4^{2-}$ with distilled water, filtered and dried into a vacuum at 40° C.

Yield: 99.4 g.; magnetic data: Br/σ=217 G.g.$^{-1}$.cm.$^3$, iHc=62 oe.

(b) *Pigment formation.*—119.0 g. $CrO_3$+8.00 g. $CrO_2$ nuclei from 16*a*+16.0 ml. $H_2O$ are mixed well, filled into a V4A tube, put under an oxygen pressure of 120 atmospheres in an autoclave above $H_2O$ and then heated to 300° C. in about 60 minutes (pressure 270 atmospheres) and kept under these conditions for 8 hours. Further working up as for the nuclear material.

Yield: 103.3 g.; magnetic data: Br/σ=281 G.g.$^{-1}$.cm.$^3$, iHc=75 oe.

*Example 17*

(a) *Formation of nuclei.*—119.0 g. $CrO_3$+8.00 g. $PbO_2$+2.0 ml. $H_2O$ are mixed well, introduced into a V4A tube and put under an oxygen pressure of 100 atmospheres in an autoclave above $H_2O$ and then heated to 280° C. in about 60 minutes, and the pressure is then adjusted to 200 atmospheres and these conditions maintained for 8 hours. After cooling, the substance is powdered, washed free from $CrO_4^{2-}$ with distilled $H_2O$, filtered and dried in a vacuum at 400° C.

Yield: 103.9 g.; magnetic data: Br/σ=233 G.g.$^{-1}$.cm.$^3$, iHc=69 oe.

(b) *Pigment formation.*—119.0 g. $CrO_3$+8.00 g. $CrO_2$ nuclei from 17*a*+16.0 ml. $H_2O$ are mixed well, filled into a V4A tube, put under an oxygen pressure of 120 atmospheres in an autoclave above $H_2O$ and then heated to 300° C. in about 60 minutes (270 atmospheres pressure) and kept under these conditions for 8 hours, further working up as for the nucleus.

Yield: 102.6 g.; magnetic data: Br/σ=271 G.g.$^{-1}$.cm.$^3$, iHc=83 oe.

*Example 18*

(a) *Formation of nuclei.*—119.0 g. $CrO_3$+8.00 g. $UO_3$, in the form of $UO_4 \cdot 2H_2O$+2.0 ml. $H_2O$ are mixed well, introduced into a V4A tube and put under an oxygen pressure of 100 atmospheres in an autoclave above $H_2O$ and then heated to 280° C. in about 60 minutes, and the pressure is then adjusted to 200 atmospheres and these conditions maintained for 8 hours. After cooling, the substance is powdered, washed free from $CrO_4^{-2}$ with distilled water, filtered and dried in a vacuum at 40° C.

Yield: 84.3 g.; magnetic data: Br/σ=147 G.g.$^{-1}$.cm.$^3$, iHc=73 oe.

(b) *Pigment formation.*—119.0 g. $CrO_3$+8.00 g. $CrO_2$ nuclei from 18*a*+16.0 ml. $H_2O$ are mixed well, filled into a V4A tube, put under an oxygen pressure of 120 atmospheres in an autoclave above $H_2O$ and then heated to 300° C. in about 60 minutes (pressure 270 atmospheres) and kept under these conditions for 8 hours. Further working up as for the nucleus.

Yield: 106.8 g.; magnetic data: Br/σ=249 G.g.$^{-1}$.cm.$^3$, iHc=61 oe.

*Example 19*

(a) *Formation of nuclei.*—119.0 g. $CrO_3$+5.82 g. Te (met.)+2.0 ml. $H_2O$ are mixed well, introduced into a V4A tube and put under an oxygen pressure of 100 atmospheres in an autoclave above $H_2O$ and then heated to 280° C. in about 60 minutes and the pressure is then adjusted to 200 atmospheres and these conditions maintained for 8 hours. After cooling, the substance is powdered, washed free from $CrO_4^{2-}$ with distilled water, filtered and dried in a vacuum at 40° C.

Yield: 104.8 g.; magnetic data: Br/σ=270 G.g.$^{-1}$.cm.$^3$, iHc=145 oe.

(b) *Pigment formation.*—119.0 g. $CrO_3$+8.00 g. $CrO_2$ nuclei from 19*a*+16.0 ml. $H_2O$ are mixed well, filled into a V4A tube, put under an oxygen pressure of 120 atmospheres in an autoclave over $H_2O$ and then heated to 300° C. in about 60 minutes (pressure 270 atmospheres) and kept under these conditions for 8 hours. Further working up as for the nuclear material.

Yield: 101.8 g.; magnetic data: Br/σ=451 G.g.$^{-1}$.cm.$^3$, iHc=274 oe.

*Example 20*

(a) *Formation of nuclei.*—119.0 g. $CrO_3$+8.00 g. $TeO_2$+2.0 ml. $H_2O$ are mixed well, introduced into a V4A tube and put under an oxygen pressure of 100 atmospheres in an autoclave over $H_2O$ and then heated to 280° C. in about 60 minutes, the pressure is adjusted to 200 atmospheres and these conditions are maintained for 8 hours. After cooling, the substance is powdered, washed free from $CrO_4^{2-}$ with distilled water, filtered and dried in a vacuum at 40° C.

Yield: 105.6 g.; magnetic data: Br/σ=247 G.g.$^{-1}$.cm.$^3$, iHc=143 oe.

(b) *Pigment formation.*—119.0 g. $CrO_3$+8.00 g. $CrO_2$ nuclei from 20*a*+16.0 ml. $H_2O$ are mixed well, introduced into a V4A tube, put under an oxygen pressure of 120 atmospheres in an autoclave above $H_2O$ and then heated to 300° C. in about 60 minutes (pressure 270 atmospheres) and kept under these conditions for 8 hours. Further working up as for the nuclear material.

Yield: 98.7 g.; magnetic data: Br/σ=482 G.g.$^{-1}$.cm.$^3$, iHc=393 oe.

*Example 21*

(a) *Formation of nuclei.*—119.0 g. $CrO_3$+2.057 g. CoO in the form of carbonate+8.00 g. $Sb_2$+2.0 ml. $H_2O$ are mixed well, introduced into a V4A tube, put under an oxygen pressure of 100 atmospheres in an autoclave about $H_2O$ and then heated to 280° C. in about 60 minutes and the pressure is adjusted to 200 atmospheres and these conditions maintained for 8 hours. After cooling, the substance is powdered, washed free from $CrO_4^{2-}$ with distilled $H_2O$, filtered and dried in a vacuum at 40° C.

Yield: 99.6 g.; magnetic data: $Br/\sigma=213$ G.g.$^{-1}$.cm.$^3$, iHc=220 oe.

(b) *Pigment formation.*—119.0 g. $CrO_3$+8.00 g. $CrO_2$ nuclei from 21*a*+16.0 ml. $H_2O$ are mixed well, filled into a V4A tube, put under an oxygen pressure of 120 atmospheres in an autoclave over $H_2O$ and then heated to 300° C. in about 60 minutes (pressure 270 atmospheres) and kept under these conditions for 8 hours. Further working up as for the nuclear material.

Yield: 102.9 g.; magnetic data: $Br/\sigma=477$ G.g.$^{-1}$.cm.$^3$, iHc=420 oe.

We claim:

1. Process for the production of a ferromagnetic material with a rutile type lattice containing at least 85% by weight of $CrO_2$ as host component and modifying additives of the group consisting of oxides and fluorides as guest components in an effective amount of up to 15% by weight comprising the steps of (a) heating a mixture containing $CrO_3$ and a chemical individual capable of yielding, under the conditions hereinafter set forth, the guest component selected from the group consisting of oxides and fluorides of cations having radii between 0.98 and 0.46 A in an aqueous medium under hydrothermal conditions at a temperature of between 100 and 500° C. and a pressure of between 1 and 500 atmospheres for 0.5 to 10 hours to form crystallization nuclei consisting of $CrO_2$ and the guest component and washing the resultant product substantially free from $CrO^{-1}$ with water;

(b) heating the crystallization nuclei produced in step (a) with a product of the group consisting of $CrO_3$ and a mixture of $CrO_3$ and the guest component in an aqueous medium under hydrothermal conditions at a temperature between 100 to 500° C. and a pressure between 1 to 500 atmospheres for 1 to 16 hours to effect growth of the crystallization nuclei up to a final length of about 2$\mu$; and (c) working up the final product by filtering, washing and drying, the ratio by weight of $CrO_3$ and the guest component in the steps (a) and (b) being adjusted to obtain product crystals consisting of at least 85% by weight of $CrO_2$ and 0.1 to 15% by weight of said guest component.

2. Process according to claim 1 which comprises heating the reaction mixture of $CrO_3$ and the guest component in step (a) at a temperature of between 100 and 300° C. and a pressure of between 50 and 300 atmospheres.

3. Process according to claim 1 wherein said cation is a member of the group consisting of Li, Na, K, Be, Mg, Al, Ga, In, Ge, Sn, Pb, As, Sb, Bi, Se, Te, Cu, Zn, Sc, Ti, Zr, Hf, V, Nb, Ta, Mo, W, U, Mn, Tc, Re, Fe, Co, Ni, Ru, Pt and J.

4. Process according to claim 1 wherein the guest component is applied as chemical individual capable of yielding an oxide under the conditions of step (a).

5. Process according to claim 4 wherein the guest component is applied as a chemical individual selected from the group consisting of carbonates, halides, nitrates, sulfates and sulfides.

6. Process according to claim 1 wherein said cations are platinum.

7. Process according to claim 1 wherein said cations are antimony.

8. Process according to claim 1 wherein said cations are tellurium.

9. Process according to claim 1 wherein said cations are manganese.

10. Process according to claim 1 wherein said cations are cobalt.

11. Process according to claim 1 which comprises the steps of (a) heating a mixture containing $CrO_3$ and the guest component in an amount up to 50% by weight referred to $CrO_3$ in an aqueous medium under hydrothermal conditions at a temperature between 100 to 500° C. and a pressure between 50 to 300 atmospheres to form crystallization nuclei consisting of $CrO_2$ and the guest component and (b) heating the crystallization nuclei produced in step (a) with an additional amount of $CrO_3$ to yield final crystals consisting of at least 85% by weight of $CrO_2$ and 0.1 to 15% by weight of the guest component in an aqueous medium under hydrothermal conditions at a temperature of 100 to 500° C. and a pressure of 150 to 300 atmospheres to effect growth of the crystallization nuclei up to a final length of about 2$\mu$.

References Cited

UNITED STATES PATENTS

| | | | |
|---|---|---|---|
| 2,923,683 | 2/1960 | Ingraham | 252—62.5 |
| 3,034,988 | 5/1962 | Ingraham | 252—62.5 |
| 3,068,176 | 12/1962 | Ingraham | 252—62.5 |
| 3,078,147 | 2/1963 | Cox | 252—62.5 |
| 3,243,260 | 3/1966 | Kubota et al. | 252—62.5 |
| 3,278,263 | 10/1966 | Cox | 252—62.5 |

HELEN M. McCARTH, *Primary Examiner.*

TOBIAS E. LEVOW, ROBERT D. EDMONDS, *Examiners.*

UNITED STATES PATENT OFFICE

CERTIFICATE OF CORRECTION

Patent No. 3,371,043 February 27, 1968

Franz Hund et al.

It is certified that error appears in the above identified patent and that said Letters Patent are hereby corrected as shown below:

Column 9, line 33, $CRO^{-1}$ should read $CRO_4^{-1}$

Signed and sealed this 23rd day of September 1969.

(SEAL)
Attest:

Edward M. Fletcher, Jr.
Attesting Officer

WILLIAM E. SCHUYLER, JR.
Commissioner of Patents